July 19, 1960      J. P. MALEC      2,945,560
ADJUSTABLE AUTOMATIC OILER FOR AIR CONDUITS
Filed Jan. 13, 1958      2 Sheets-Sheet 1
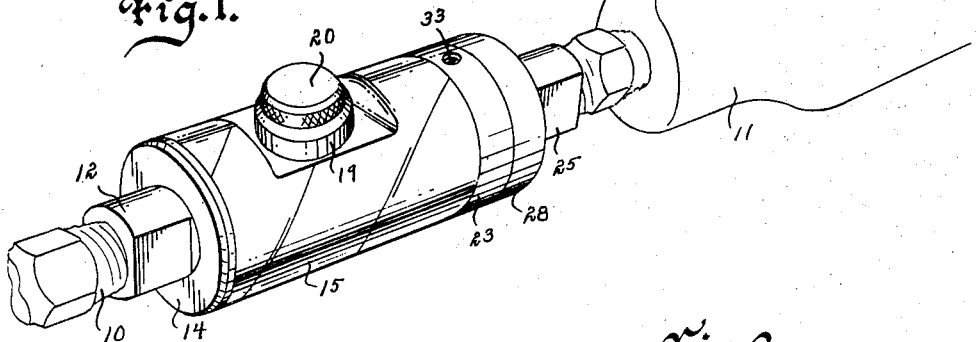
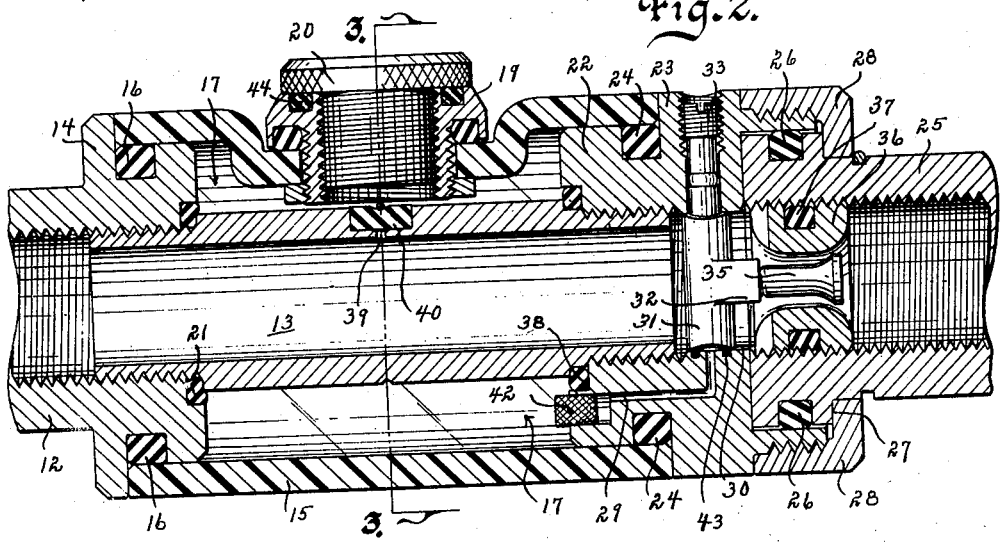
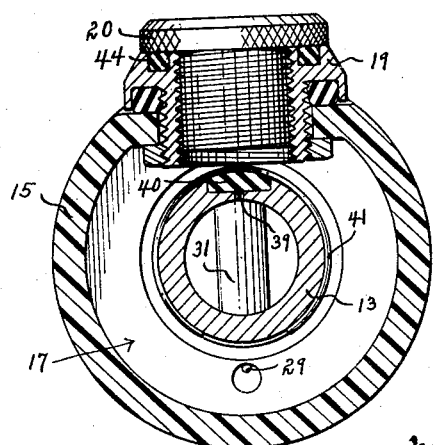
Witness
Edward P. Seeley
Inventor
Jerry P. Malec
by M. Talbert Dick
Attorney

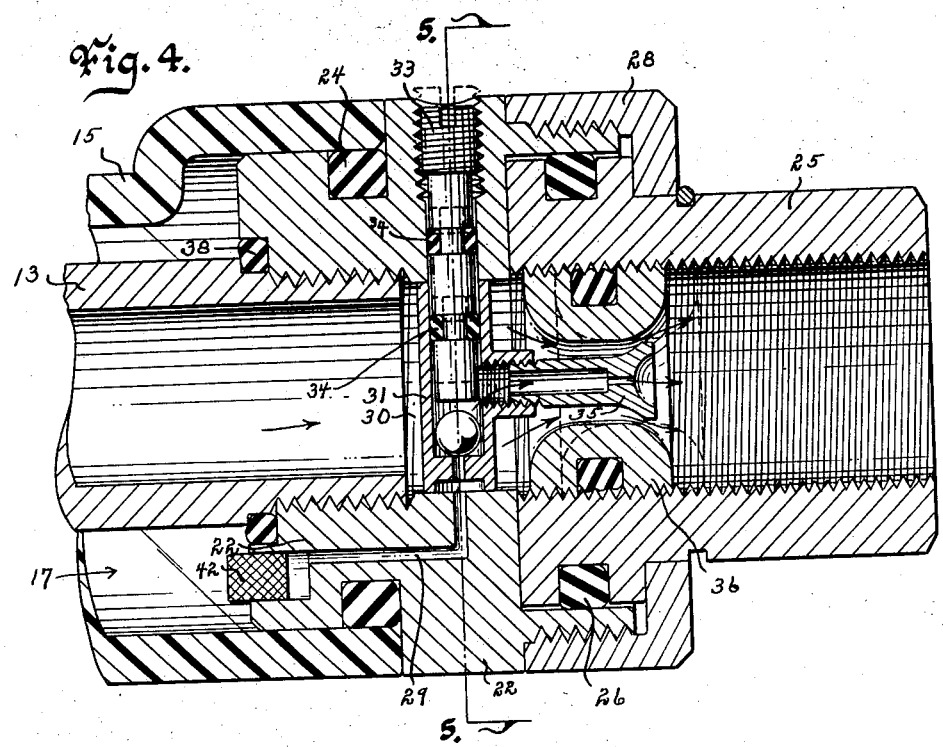
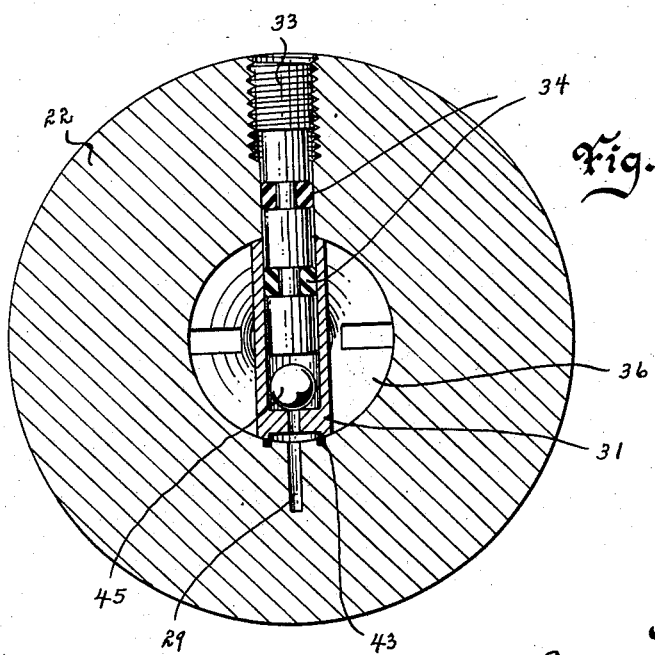

United States Patent Office 2,945,560
Patented July 19, 1960

2,945,560

ADJUSTABLE AUTOMATIC OILER FOR AIR CONDUITS

Jerry P. Malec, Omaha, Nebr., assignor, by mesne assignments, to Comet Industries, Inc., Omaha, Nebr., a corporation of Nebraska Filed Jan. 13, 1958, Ser. No. 708,450

4 Claims. (Cl. 184—55)

This invention relates to air line oilers and more particularly to an air conduit oiler that is adjustable and automatic in operation.

The use of a source of air under pressure to actuate pneumatic tools, equipment and like, is on the increase. The advantages are that the air power means is of light weight, fire hazard is eliminated, and noise level is reduced to a minimum. However, it is most difficult to oil or keep oiled the tools, equipment or like, that are being actuated by the air force. Attempts have been made to introduce oil directly into the air stream thus automatically lubricating the moving parts of the tools or equipment. Such devices, however, usually either seriously drop the air pressure at point of use, produce too much back pressure, or only operate intermittently when the air pressure flow is affected by the intermittent use of air flow. In the first instance much efficiency is lost and in the latter instance some equipment would get too much oil, while other equipment using a substantially constant air stream would get little if any oil. Also, some tools, such as staplers, using only minimum air power would never be properly lubricated.

Therefore, one of the principal objects of my invention is to provide an air line oiler that functions continuously during the passage of the air stream to which it is associated.

A further object of this invention is to provide an air conduit oiler that does not materially reduce the air pressure stream passing from it.

A still further object of this invention is to provide an automatic oiler for an air pressure stream that introduces oil into the air stream without the air passing through the oil compartment.

A still further object of my invention is to provide an oiler for air lines that may be imposed in the line adjacent to the tool or equipment being used.

A still further object of this invention is to provide an air conduit oiler that introduces the oil into the air stream in the form of an oil film.

A still further object of this invention is to provide an oiler for air lines that is easily observable as to its function and its oil supply.

Still further objects of my invention are to provide an air line oiler that is of light weight, and capable of adjustment to compensate for various grades of oil, various air pressures, and various air volume usage.

Still further objects of this invention are to provide an air line oiler that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my oiler in use,

Fig. 2 is an enlarged longitudinal sectional view of the oiler and more fully illustrates its construction, Fig. 3 is an enlarged cross sectional view of my device taken on line 3—3 of Fig. 2, Fig. 4 is an enlarged longitudinal sectional view of the forward end portion of my oiler, and Fig. 5 is an enlarged cross sectional view of the device taken on line 5—5 of Fig. 4.

In these drawings I have used the numeral 10 to designate an air conduit adapted to be connected to a source of air pressure (not shown). The numeral 11 designates a pneumatic tool. My device is imposed between the conduit 10 and tool 11 and which I will now describe in detail.

The numeral 12 designates a fitting detachably threaded into the forward end of the air conduit 10. The numeral 13 designates a stub pipe cylinder or pipe means having its rear end portion threaded into the forward end of the fitting 12 and communicating with the inside of the conduit 10 as shown in Fig. 1. The numeral 14 designates a stop flange extending around the fitting 12. The numeral 15 designates a transparent tube of glass, plastic or like having its rear end engaging the flange 14. The numeral 16 designates a ring gasket embracing the fitting 12, forward of the flange 14 and engaging the inside rear end of the tube 15. The tube 15 loosely embraces the stub pipe 13, and is of an inside diameter substantially greater than that of the outside diameter of the stub pipe 13, thereby providing the oil reservoir compartment 17, as shown in Fig. 3. The numeral 19 designates an oil filling neck on the tube 15 and which is closed by the detachable threaded plug 20. The numeral 21 designates a ring gasket engaging a shoulder of the stub pipe and the forward end of the fitting 12. The numeral 22 designates a fitting having its rear end portion threaded onto the forward end portion of the stub pipe cylinder 13. This fitting 22 has a stop flange 23 embracing its circumference and engaging the forward end of the transparent tube 15 as shown in Fig. 2. The numeral 24 designates a gasket ring embracing the fitting 22 to the rear of the stop flange 23 and engaging the inner forward end portion of the tube 15. The numeral 25 designates a hollow connection having its forward end detachably threaded onto the pneumatic tool 11 or onto an air conduit leading from my device. The inside of this connection communicates with the inside of the fitting 22 and the forward open end of the stub pipe 13 by having its rear end portion detachably extending into the forward end portion of the fitting 22, as shown in Fig. 4. The numeral 26 designates an O-ring gasket embracing that part of the connection that extends into the fitting 22. The end of the connection that extends into the fitting 22 is enlarged to provide a circular peripheral shoulder 27. The numeral 28 designates a cup nut embracing the connection 25, engaging the shoulder 27, and threaded onto the fitting 22, as shown in Fig. 2.

The numeral 29 designates an oil passageway in the fitting 22 having one end communicating with the inside of the oil compartment 17 and its other end communicating with the inside of its central opening 30 and forward of the stub pipe 13. The numeral 31 designates a pipe transversely positioned in the opening 30 of the fitting 22. One end of this pipe 31 embraces the outlet end of the passageway 29 as shown in Fig. 5. The numeral 32 designates a pipe stem extending forwardly from the center length of the pipe 31 and communicating with the inside of the pipe 31. The numeral 33 designates a cap screw shaft transversely threaded through the fitting 22 and into the end of the pipe 31 opposite from the passageway 29, as shown in Fig. 4. This cap screw shaft has ring gaskets 34 and its free end may close or adjustably partially close the opening of the stem 32 where it communicates with the inside of the pipe 31. Threaded onto the forward end portion of the stem 32 and extending forwardly thereof is a nozzle 35, having its forward open end enlarged and concave as shown in Fig. 4. The numeral 36 designates a collar ring threaded into the connection 25. The collar 36 is of substantial thickness and the wall of its center hole is curved to increase in diameter both at entrance and exit, as shown in Fig. 2. The bell shaped nozzle 35 and this collar ring 36 produces a Venturi action whenever air passes through the device and the relative pressure drop inside the nozzle is adjustably obtained by threading the collar 36 further rearwardly or forwardly in the connection 25 and relative to the position of the nozzle 35. The collar 36 carries a rubber ring 37. This ring provides a friction brake to prevent movement of the collar 36 within the part 25. This is desirable inasmuch as the vibration of any air tool of the line would tend to vibrate my device and possibly cause thereby the accidental rotation and maladjustment of the member 36.

The bores of the housing ends 14 and 22, pipe 13 and pipe 25 provide a pipe means extending through the center of the barrel housing and which is the air stream passageway.

From the foregoing it will be appreciated that my device is capable of two adjustments and these two adjustments will compensate for all purposes. The cap screw rod 33 serves two purposes. It detachably holds the pipe 31 and nozzle in position and also acts as an adjustable valve for regulating the passageway of the stem 32. By screwing the cap screw rod further outwardly, the valve means will be accordingly opened, and by screwing it inwardly the valve means will be accordingly restricted. Inasmuch as the cap screw rod has its end to the outside of the device, the oil passageway control may be actuated from outside the unit thereby not requiring its being taken apart for adjustment. The collar 36 is adjustable to regulate the device relative to the air pressure and velocity of the air stream passing through the device. This is accomplished by moving the collar 36 forward (in the direction of the air flow in the device) for an air flow of low velocity or in the low volume ranges. The collar 36 is moved to its extreme rearward adjustment (in the direction against the flow of air in the device) for high velocities or volumes of air. The movement of the collar 36 is accomplished by a slot in the collar 36 for a spanner type wrench so that it may be rotated left or right and its position in relation to the Venturi nozzle 35 changed. The device will therefore operate successfully even with the air stream of low velocity. The feeding of the oil into the air stream will be continuous. Whenever air is passed or is being passed to the pneumatic tool or equipment, it will be impregnated with oil particles for automatically oiling such tools or equipment.

The inside of the oil reservoir supply compartment 17 will be air pressure equalized with that of the inside of the pipe 13. This is accomplished by the rubber valve 40 opening over the passage 39 whenever the fluid pressure contained in the tube 13 is in excess of the pressure contained in the oil reservoir supply compartment 17. By having the end of the nozzle 35 curved and concave, the oil will pass into this dished-out portion in the form of an oil film, and as a film will pass therefrom into the air stream. Nozzle 35 is of a dished concave design for several reasons, i.e., to prevent the air stream from directly atomizing the complete oil film from the center passage of the nozzle. Only the outer edge, or the thinnest section, of the oil film is atomized. Also, the enlarged "bell" section at the end of the nozzle is contoured so as to help accelerate the air by restricting the (collar 36) passage at low velocities when the collar screw is adjusted for minimum air velocities as previously described.

The passageways inside the nozzle 35 are of special note also. It can be seen from the drawing of the nozzle 35 set out in Fig. 4 of the drawings that there are two diameters to the internal passage in the nozzle 35. The two diameters are connected to form a passage for the transfer of fluid (oil) to the dish shaped end of nozzle 35. The smallest diameter of this internal passage is immediately adjacent to the dished end of the nozzle 35 and tends to prevent the drainage or leakage of oil into the air conduit under conditions of no air flow in the device. By virtue of the wick action of filter 42 and the restricted passageway in the nozzle 35 oil is conserved so that no oil is discharged from the nozzle 35 except upon passage of air through the adjustable automatic oiler device. Oil being discharged into the air conduit without the passage of air has been a common failing of all previous attempts at conduit oiling. By the tube housing 15 being transparent, the user may easily observe the volume of oil in the device and its rate of use. The tube housing 15 may be rotated relative to the fittings 12 and 22 to position the fitting cap 20 as desired. The device will operate in any position from vertical to horizontal and, inasmuch as its operation is continuous and automatic, it is suitable for use with both turbine and piston type tools.

The numeral 38 designates a gasket ring between the stub pipe 13 and member 22. To equalize pressure within the stub pipe 13 and the oil compartment 17, I have provided a simple valve means in the wall of the pipe 13. The numeral 39 designates a passageway extending from the inside of the stub pipe 13, and which is yieldingly closed by a rubber plate member 40, which is yieldingly held in place over the passageway 39 by spring ring 41, as shown in Fig. 3.

Any suitable air filter 42 may be imposed in the conduit 29. The numeral 43 designates an O-ring in the opening 30 engageable by the member 31. The numeral 44 designates a gasket between the cap 20 and neck 19.

The numeral 45 designates a loose ball valve in the bottom of the part 31 and below the shaft member 33, as shown in Fig. 5.

The stub pipe 13, the fitting 12, the fitting 22, and the hollow connection 25, form a pipe means extending through the tube housing.

Some changes may be made in the construction and arrangement of my adjustable automatic oiler for air conduits without departing from the real spirit and purpose of my invention, and it is my intention to cover by my claims, any modified forms of structure or use of mechanical equivalents which may be reasonably included within their scope.

I claim:

1. In a device for furnishing a lubricating oil into the air stream of an air line conduit, a housing, a pipe means extending through said housing having an outside diameter substantially less than that of the inside diameter of said housing to provide an oil supply compartment between the inside of said housing and the outside of said pipe means, an oil passageway having one end communicating with the oil supply compartment between said housing and said pipe means, a nozzle in said pipe means communicating with the other end of said passageway, and having its outlet end surface enlarged, curved and concave whereby oil passing through the nozzle will flow outwardly on its curved and concave end surface in a progressively thinning oil film, and a restricting collar adjustably threaded into said pipe means and capable of loosely embracing said nozzle.

2. In a device for furnishing a lubricating oil into the air stream of an air line conduit, a housing, a pipe means extending through said housing having an outside diameter substantially less than that of the inside diameter of said housing to provide an oil supply compartment between the inside of said housing and the outside of said pipe means, an oil passageway having one end communicating with the oil supply compartment between said housing and said pipe means, a nozzle in said pipe means communicating with the other end of said passageway, and having its outlet end surface enlarged, curved and concave whereby oil passing through the nozzle will flow outwardly on its curved and concave end surface in a progressively thinning oil film, and a restricting collar adjustably threaded into said pipe means and capable of loosely embracing said nozzle; said nozzle having an enlarged outer flared end portion extending radially in a direction toward said restricting collar.

3. In a device for furnishing a lubricating oil into the air stream of an air line conduit, a housing, a pipe means extending through said housing having an outside diameter substantially less than that of the inside diameter of said housing to provide an oil supply compartment between the inside of said housing and the outside of said pipe means, an oil passageway having one end communicating with the oil supply compartment between said housing and said pipe means, a nozzle in said pipe means communicating with the other end of said passageway, and having its outlet end surface enlarged, curved and concave whereby oil passing through the nozzle will flow outwardly on its curved and concave end surface in a progressively thinning oil film, a restricting collar adjustably threaded into said pipe means and capable of loosely embracing said nozzle, and a one way valve in said passageway.

4. In a device for furnishing a lubricating oil into the air stream of an air line conduit, a housing, a pipe means extending through said housing having an outside diameter substantially less than that of the inside diameter of said housing to provide an oil supply compartment between the inside of said housing and the outside of said pipe means, an oil passageway having one end communicating with the oil supply compartment between said housing and said pipe means, a nozzle in said pipe means communicating with the other end of said passageway, and having its outlet end surface enlarged, curved and concave whereby oil passing through the nozzle will flow outwardly on its curved and concave end surface in a progressively thinning oil film, and a restricting collar substantially a one-half circle in cross section adjustably threaded into said pipe means and capable of loosely embracing said nozzle.

References Cited in the file of this patent

UNITED STATES PATENTS

| Re. 24,291 | Goodyer | Mar. 19, 1957 |
|---|---|---|
| 700,797 | Morris | May 27, 1902 |
| 1,102,034 | Franklin | June 30, 1914 |
| 1,600,262 | Wickham | Sept. 21, 1926 |
| 1,621,771 | Egan | Mar. 22, 1927 |
| 1,688,320 | Bassett | Oct. 23, 1928 |
| 1,689,780 | Hulshizer | Oct. 30, 1928 |
| 1,757,084 | Hansen | May 6, 1930 |
| 2,047,672 | Delling | July 14, 1936 |
| 2,459,398 | Walters | Jan. 18, 1949 |
| 2,571,770 | Semon | Oct. 16, 1951 |
| 2,687,187 | Lake | Aug. 24, 1954 |
| 2,747,688 | Faust | May 29, 1956 |
| 2,778,619 | Goodyer | Jan. 22, 1957 |
| 2,808,343 | Simmons | Oct. 1, 1957 |

FOREIGN PATENTS

| 662,285 | France | Mar. 18, 1929 |